(12) United States Patent
Eklund

(10) Patent No.: US 8,363,943 B2
(45) Date of Patent: Jan. 29, 2013

(54) FORMING INFORMATION FOR THE CALENDAR APPLICATION OF AN ELECTRONIC DEVICE

(75) Inventor: Kimmo Eklund, Turku (FI)

(73) Assignee: Nokia Corporation, Espoo (FI)

( * ) Notice: Subject to any disclaimer, the term of this patent is extended or adjusted under 35 U.S.C. 154(b) by 954 days.

(21) Appl. No.: 11/885,000

(22) PCT Filed: Mar. 3, 2006

(86) PCT No.: PCT/FI2006/050090
§ 371 (c)(1),
(2), (4) Date: Aug. 24, 2007

(87) PCT Pub. No.: WO2006/095053
PCT Pub. Date: Sep. 14, 2006

(65) Prior Publication Data
US 2008/0263087 A1    Oct. 23, 2008

(30) Foreign Application Priority Data
Nov. 3, 2005   (FI) ...................................... 20055111

(51) Int. Cl.
G06K 9/00    (2006.01)
(52) U.S. Cl. ......................................... 382/181; 382/321
(58) Field of Classification Search .................. None
See application file for complete search history.

(56) References Cited

U.S. PATENT DOCUMENTS

| 5,392,447 | A | 2/1995 | Schlack et al. ............... 395/800 |
| 5,539,427 | A | 7/1996 | Bricklin et al. ............... 345/118 |
| 6,542,623 | B1 * | 4/2003 | Kahn ............................ 382/114 |
| 6,820,096 | B1 * | 11/2004 | Kanevsky et al. ................... 1/1 |
| 2004/0017482 | A1 | 1/2004 | Weitman .................. 348/207.99 |
| 2004/0252877 | A1 | 12/2004 | Rose et al. ..................... 382/182 |
| 2005/0024346 | A1 | 2/2005 | Dupraz et al. ................. 345/179 |
| 2005/0041862 | A1 | 2/2005 | Lo ................................. 382/181 |

FOREIGN PATENT DOCUMENTS

| EP | 0681250 A2 | 11/1995 |
| GB | 2 382 430 A | 5/2003 |
| JP | 11-184924 | 7/1999 |
| JP | 2000171886 A | 6/2000 |
| JP | 2001052015 A | 2/2001 |
| WO | WO 00/73887 A1 | 12/2000 |
| WO | WO 01/48590 A1 | 5/2001 |
| WO | WO 02/099738 A1 | 12/2002 |

* cited by examiner

Primary Examiner — Chan S Park
Assistant Examiner — Elisa Rice
(74) Attorney, Agent, or Firm — Harrington & Smith

(57) ABSTRACT

The invention relates to an electronic device, which includes a calendar application (CAL), in which event (EVENT) information is arranged to be maintained and processing means (CPU, OCR), which are arranged to form event information from the image information for the calendar application, which image information is formed from an information source with a location-independent layout. In the invention, the event information is arranged to be formalized by the processing means for the calendar application. In addition, the invention also relates to a corresponding method and program product.

14 Claims, 4 Drawing Sheets

FORMING INFORMATION FOR THE CALENDAR APPLICATION OF AN ELECTRONIC DEVICE

TECHNICAL FIELD

The invention concerns an electronic device, which includes
- a calendar application, in which event information is arranged to be maintained, and
- processing means, which are arranged to form event information for the calendar application from the image information, which image information is formed from an information source that has a location-independent layout.

In addition, the invention also relates to a corresponding method and program product for implementing the invention.

BACKGROUND

Different kinds of calendar applications are already known from current portable electronic devices. Various kinds of event information can be maintained in them in an updatable form. The basic form of the event information can include, for example, a description, a point of time, and a place of the event. Of course information contents that are both more restricted and more extensive than this are also possible.

However, the addition, according to known operating procedures, of calendar events takes place extremely laboriously. In present devices, the user may often have to wade through a hierarchically arranged user interface to activate first of all the calendar application and then secondly also through itself the calendar application to select a date and point of time for the event and to set a possible event description and location for it. This can be referred to generally as setting the event information.

Solutions are known from international patent application publications WO-01/48590 A1, WO-00/73887 A1, and WO-02/099738 A1, in which information can be formed for an electronic device, from image information. The two first-mentioned of these disclose solutions, in which information is formed for an application, essentially in connection with its creation. The solutions are based on a special writing base that is throughout equipped with location codes. The information written on the base can be recognized from the location codes identified from consecutive image frames, the text written on the base being determined from the changes in the location between the image frames.

SUMMARY

The present invention is intended to bring about a way of adding event information to a calendar application, which is effortless from the point of view of the end user and which is particularly suitable for application in portable devices possibly equipped with cameras. The characteristic features of the device according to the invention are stated in the accompanying Claim 1 while the characteristic features of the method are stated in Claim 9. In addition, the invention also concerns a corresponding program product, the characteristic features of which are stated in the accompanying Claim 17.

In the invention, the calendar application is surprisingly updated from image information. According to a first embodiment, the image information can be captured using the camera in the device. According to a second embodiment, the image information can also be received by the device from some other device.

The camera can be used to capture an image from an information source with a location-independent layout. From the image it is possible to identify or derive, more generally decompress information defining the event, by exploiting the device's image-processing means. The formal event information formed from the image information can be used to supplement desired parts of the events being maintained in the calendar application.

The invention solves the aforementioned problems, for example, in mobile stations or other similar portable devices, which are equipped, for example, with a camera for forming image information on a imaging subject. By pointing the camera that is functionally arranged in the device at the imaging subject, more generally the source of the information, and capturing an image of it, an event can be quickly and easily added to the calendar.

According to one embodiment, at least part of the point of time information of the event can be, for example, identified, or even more generally derived, from the image information. After this the device can suggest to the user, for example, a suitable point of time, or even directly open, without human interaction, the calendar application at the point of time in question for adding or supplementing the event. The user can then add the event information they desire to this, or at its simplest accept the event with its point of time data that the device suggests and that has been identified from the image.

According to yet another embodiment, the description information can also be identified from the image information. One embodiment also permits the conversion of the point of time identified from the image to a time/date format suitable for the device/calendar.

Other characteristic features of the invention will become apparent from the accompanying Claims while additional advantages achieved are itemized in the description portion.

BRIEF DESCRIPTION OF THE DRAWINGS

The invention, which is not restricted to the embodiments disclosed in the following, is examined in greater detail with reference to the accompanying figures, in which.

DETAILED DESCRIPTION

Figure 1:
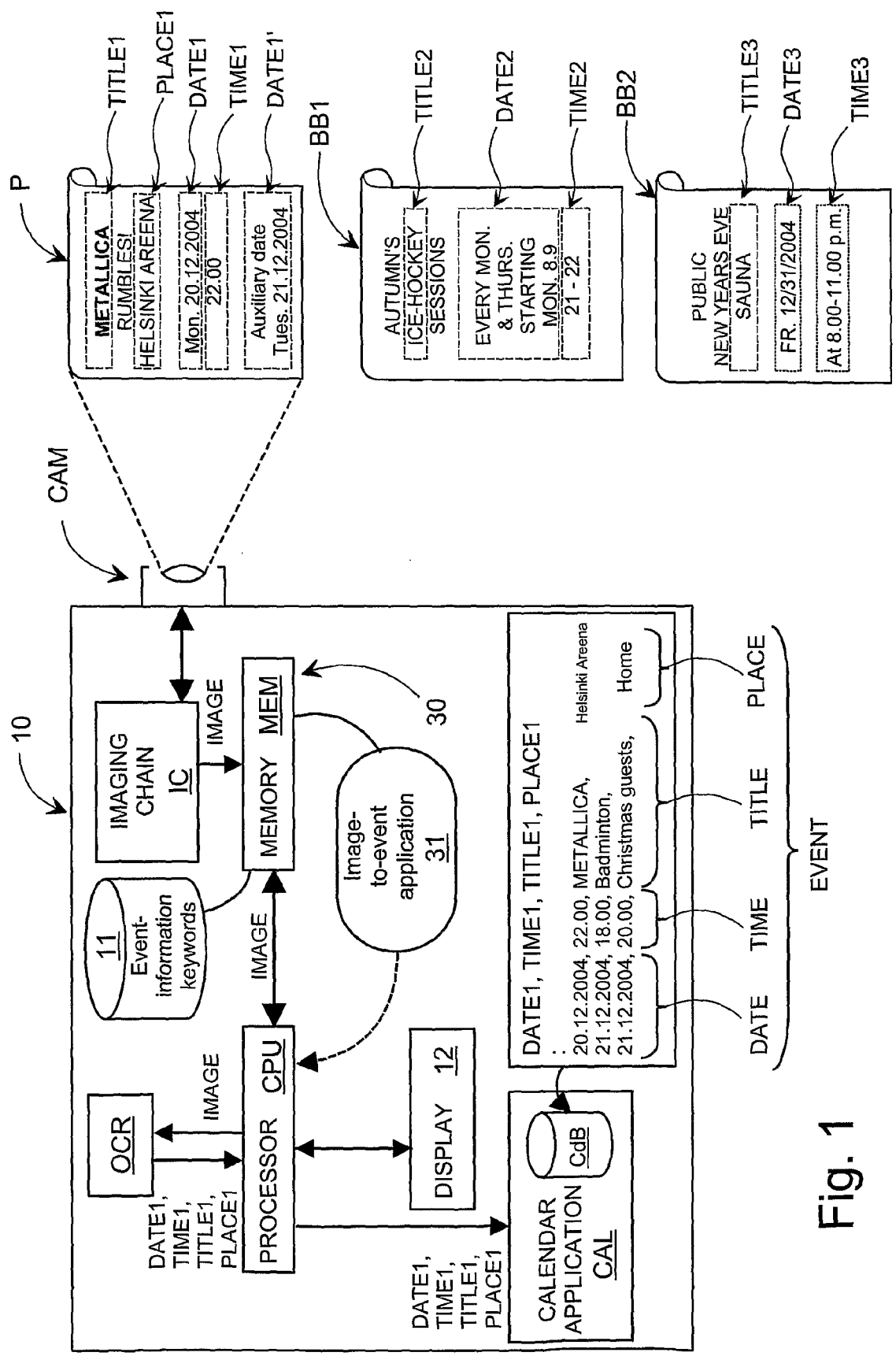
FIG. 1 shows a rough block diagram of a first example of the device according to the invention.

FIG. 1 shows a schematic application example in principle of the device 10 according to the invention. It should be understood that FIG. 1 is only a rough block-diagram presentation, which has been severely simplified with the intention of explaining the basic principle of the invention. The device 10 can be of a portable type, such as, for example, a mobile station, or similar palm device.

The device 10 includes a processor unit CPU or similar application processor functionality. It is used to control the operation of the device 10 in a manner that is, as such, known from the processor environments. In addition, in the device 10 there is a calendar application CAL and possible camera means CAM that act as imaging means together with an image-processing chains IC for forming image information IMAGE from the image subject P, BB1, BB2. Also optical character recognition, i.e. text recognition OCR is to be found in the device 10. It can be used to identify, for example, text DATE1, TIME1, TITLE1, PLACE1, for example from the image information IMAGE formed by the camera CAM.

The calendar application CAL can be, as such, known or one that is still under development. It can be used to maintain event information EVENT. Using the calendar application CAL, it is possible to operate the calendar database CdB in an updatable manner. In the calendar database CdB, there can be event records EVENT, which can include several data fields. The data fields can differ in type from each other. In that case, in each of them there will be information that is formal for each data-field type.

The event information EVENT can comprise, for example, information concerning the point of time, such as, for example, the date DATE and time TIME of the event. Of course, intervals of time, which define the duration of the event, are also possible, as also are various alarms for warning of the start of an event. Further, the event EVENT can also comprise a description, which can act as a title TITLE describing the event. The description can also comprise a field PLACE stating the location of the event. Classification of events, for example, according to their nature is, of course, also possible (for example, work/leisure/holiday/family, etc.). In general too, the basic technology relating to calendar applications CAL, as well as their characteristics and features, will be quite obvious to those versed in the art and their connection to the various embodiments of the invention is in no way restricted.

According to a first embodiment of the invention, in the device 10 according to the invention, event information EVENT for the calendar application CAL can be formed in a surprising manner from the image information IMAGE formed by the camera means CAM. In the formation, it is possible to apply the text-recognition function OCR being in the device 10. It can be used to form primarily text data from the image information IMAGE. It is possible to further derive from the text data, for example, time information DATE, TIME and description information TITLE, PLACE, stated more generally, any formal information EVENT for the calendar application CAL.

The following is a description of the method according to the invention, in some different embodiments, in the case of which reference is made to the device 10 of FIG. 1 and the information sources P, BB1, BB2 shown in it. In addition, reference is made to the program product 30 shown in FIG. 3, the code means 31.1-31.6 of which are referred to at suitable places in the description of the method.

Initially, the basic principle of the entire method is reviewed with reference to the poster P shown in FIG. 1. The other exemplary applications are only dealt with in the cases of those stages in which the method can comprise different kinds of procedure. However, in all the embodiments the basic principle of the invention is the same. This is because in the method according to the invention the image information IMAGE, particularly a single image, is analysed in order to add event information EVENT to the calendar CAL of the device 10. The image information IMAGE can be in one way or another brought to the device 10, or also formed by the device 10 itself. This is in no way restricted by the basic principle of the invention.

The initialization stage 200 of the method is followed, as stage 201, by digital imaging performed by the camera CAM of the device 10. In it, image information IMAGE, which is formed from a single image, is formed from the image subject, which in this case is represented by the poster P, by the camera CAM and the imaging chain IC connected to it. The image subject P, of which the image information IMAGE is formed, has a location-independent layout. Thus, in terms of the invention, there is no significance in which location on the information base P the information is situated. Also, in terms of the invention, there is no significance in which order or using what layout the information is presented in the information source P. The application of an information source P with a free-form layout permits the forming of event information EVENT for the calendar application CAL, from diverse sources.

Once imaging has been performed, as stage 202, the image IMAGE can be stored, for example, in the memory MEM of the device 10. On the other hand, the storing of the image IMAGE in the memory MEM is in no way essential, instead the operations according to the invention can even be performed on the viewfinder image, which is obtained from the camera CAM as a result of aiming it at the poster P.

Once the image IMAGE has been stored in the memory MEM of the device 10, an "Event from image" type application 31 can be activated from the device's 10 applications as stage 203, if the user wishes to add event information EVENT visualized in the image IMAGE to the device's 10 calendar application CAL. Once the application 31 is activated, identification of event information EVENT can be performed automatically for the stored image IMAGE or for the viewfinder image without a separate command as stage 204. This can be handled using the program code 31.1.

In cases according to the embodiments, the event information EVENT includes in this case at least point of time information DATE1, TIME1, and also possibly description information TITLE1, PLACE1. For their identification, the OCR application of the device 10, or alternatively also the application 31 can have a database 11 available, in which is stored/can be stored keywords, character strings relating to the event information EVENT, or even more generally data required to identify an event. Examples of such non-numerical character strings can include, for example, "day", "d", "date", "time", "o'clock", "a.m.", "p.m.", "Monday", "Mon.", ":" ";", etc. When some such character string appears in the data converted from the image information IMAGE to text form by the OCR, it can be assumed that even in its immediate vicinity there is probably event information EVENT specific to the character string in question. Instead of database 11, it is possible to refer generally of knowledge 31 for forming formal information from a identified body text.

In the poster application P, the information assisting the identification of event information EVENT can be identified, for example, the character strings "Mon.", "Tues.", and "o'clock". Using the OCR, the image IMAGE formed of the poster P can be converted in its entirety to text, in which case even more event information can be identified from it, such as, for example, the description TITLE1, and the point of time DATE1, TIME1 relating to the event. According to one embodiment, text immediately before or after the point of time can be selected as the description TITLE1. Alternatively, as in this case, it is also possible to select the text "METALLICA" appearing in the largest font in the poster P. Other ways of selecting are, of course, possible, as an example to be mentioned, setting the first text appearing in the poster P as the title TITLE1.

If there is a reasonable amount of text in the poster P, then nothing prevents all the text in the poster P being shown on the display 12 of the device 10. The user can then select the description they want to depict the event in the calendar CAL, for example, by lassoing. This is probably the most appropriate way of setting the event location PLACE1, because it is not at least easy to form any particular group of keywords to identify the event location. The code 31.4 in the program 30 handles the identification of the title TITLE and/or the selection of the event location PLACE through the action of the user. With reference to the embodiment, it is also obvious that information for the calendar CAL can be derived from the image information IMAGE for several different purposes. In this sense, the example sets of information EVENT (TITLE, DATE, TIME, PLACE) depicted in the description are not, of course, intended to restrict the information to be derived to/merged with the calendar CAL.

Because the character strings "Mon." and "Tues." were identified from the image in stage 204, it can be deduced in stage 205 that this is used in this connection to refer to Monday. Further, it is highly probable that the character string "Mon." will be followed by some numerical date, in which the selected separator characters are used. In this case, the separator characters are the dots (.) for clarifying the date ("20.12.2004"). Such a totality can be deduced programmatically by the application 31 to be a date DATE1 (code 31.2). Instead of deduction, it is possible also to speak more generally of formalization. Correspondingly, it is also possible in stage 205 to identify the time TIME1 from the poster P. Stated even more generally, in stage 205 at least part of at least one point of time DATE1, TIME1, DATE1' can be derived (i.e. formalized) from the image information IMAGE. In this case, both points of time DATE1, TIME1, DATE1' can be derived in their entirety. In a later stage of the method, the calendar application CAL can be activated and pre-entered (code 31.3) guided by either of the points of time DATE1, TIME1, DATE1', or by only one point of time DATE1, TIME1.

For example, in stage 205 it is also possible to perform various correctness checks. This is used to achieve greater certainty for the derivation of the most rational point of time by the using the method. Because there is a calendar application CAL in the device 10, this or corresponding knowledge 31 can be exploited to test, for example, whether the date in question 20.12.2004 even is a Monday or vice versa. In addition, it is possible to test whether the point of time in question is in the future or even, perhaps already in the past.

If the date stated in the poster P is illogical (for example, "Sat. 20.12.2004") or if some error has occurred in the text recognition, for example, due to smudging on the poster, it is then possible to return to stage 204 to search again for more logical point of time information from the image IMAGE. A second alternative is to inform the user of the device 10 of the failure of the identification. A third alternative is to pre-sent in some further sub-stages of the method, such as, for example, in the following stage 206 the point of time information that the application 31 has been erroneously recognized and an indication of an error state, in which case the user of the device 10 can be given an opportunity to correct this information suggested by the device 10 on the basis of what they have actually seen. There are thus numerous alternatives for the implementation of this too.

In stage 206 at least part of, two or more points of time DATE1, TIME1, DATE1' derived from the image information IMAGE are suggested to the user of the device 10 on the display 12 of the device 10. The user can select from the list of identified/derived points of time at least partly at least one point of time, such as, for example, "20.12.2004, 20.00". Even selecting only the date "20.12.2004" will make it easier to set the calendar event EVENT, because the device 10 will open the calendar editor CAL at the calendar page corresponding to the date in question, without demanding any operations by the user. The user themself can then set the time TIME1 for the event in question. Guided by the selected point of time DATE1, TIME1 the calendar application CAL can be activated and opened in stage 207.

In stage 208, the calendar application CAL can be pre-entered with the point of time DATE1, TIME1 derived or selected from the image IMAGE and with a corresponding description TITLE1 (code 31.5). Thus in the calendar editor the index page corresponding to the date 20.12.2004 can be opened immediately as a result of the activation of the calendar CAL and the point of time corresponding to the identified time 20.00 can be activated. At the location in question, the application's 31 pre-selected description "METALLICA" can be flashing as a suggestion, which was possibly identified in stage 204 from the image information IMAGE formed from the poster P. In stage 209, the user can put the finished touches to the event data. They can either directly accept the information DATE1, TIME1, TITLE1 pre-entered by the calendar CAL, or correct the desired parts of it, or supplement it further with the information they wish (for example, setting an alarm, reserving a period of time for the event in question, or adding additional description information, for example, the event location PLACE1 already referred to above).

In stage 210, the event is stored in manner that is, as such, known in the calendar CAL and in stage 211 the method reaches its end.

If the invention is applied to the application shown on a bulletin board BB1 (the middle source of information on the right-hand side of FIG. 1), from that may be noticed, for example, in stage 204 that this is a regularly occurring event. In the key-character-string database 11 of the OCR or the application 31, the character strings, for example, "every", "beginning" . . . etc. can be set to refer to this kind of a repeatedly occurring event. From this, it is possible to identify/conclude the repeating nature of the event and the date of commencement DATE2. Further, it is also possible to identify a possible time interval TIME2, which the event lasts each time. One example of a character string that refers to such a time interval can be "-". The formation of the event from information of this kind takes place in a manner that is entirely analogous with that of the embodiment disclosed above. Once the repeatability of the event has been recognized and, in addition, its commencement date identified, the event in question can be set in a manner that is, as such, known, in the calendar application CAL as being of a repeating type (example options being: every day, every week, every month, every year).

In the embodiment of FIG. 1 at the bottom of the right-hand side it is wished to extract the event from the advertisement BB2 into the calendar CAL. Now the user of the device 10, being in this case, such as, for example, a Finn, may be in a foreign country, for example, the USA. In that case, the local way of stating the date and time may differ from that to which the user is accustomed. If the user of the device 10 uses, in their device 10 or their calendar CAL a data/time format that is more familiar for him, in the invention the format differing from the default settings of the device 10/calendar CAL can be identified, at least partly. As a result of identification, the point of time DATE1, TIME1 derived from the image information IMAGE can be converted at least partly to the default description format used in the device 10 or the calendar application CAL (code 31.6).

Now the character string "FR." can be identified from the advertisement BB2, which is set in the device 10/application 31 to refer to Friday. Next, it is recognized that the order of the date DATE3 is different to that in the default format (first month, then day) and it is converted to the format that is more familiar to the user ("31.12.2004"). The time TIME3 can also be identified from the format used in it ("p.m."). This can also be converted to a suitable form ("20.00-23.00") for the device 10 and also the calendar CAL. In stage 209, the title TITLE3 can be chosen to be "SAUNA".

Figure 4:
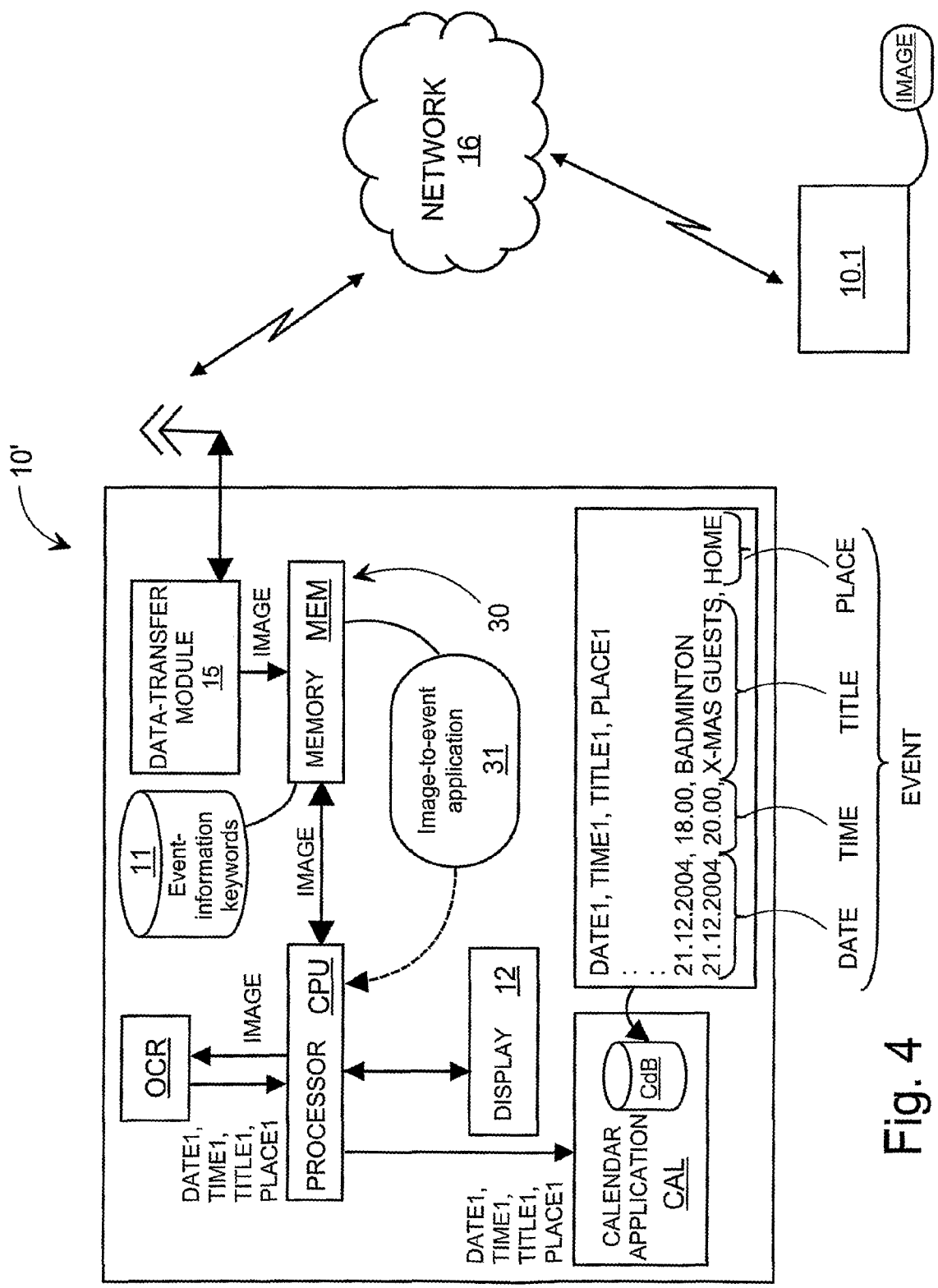
FIG. 4 shows a rough block diagram of a second example of the device according to the invention.

FIG. 4 shows yet another embodiment of the devise 10' according to the invention. It will be seen from it that the device 10' need not necessarily be even equipped with a camera in order to implement the invention. The device 10' can be a mobile station equipped with a calendar application CAL or, for example, a PC computer. There are now data-transfer means 15 in the device 10'. They permit data to be transferred with other devices 10.1 in a data communication network 16. In this case, the data communication network 16 can be any network whatever, as it too is in no way restricted by the invention. Of course, such a device is also possible, in which there are both camera means and also data-transfer means CAM, 15.

Figure 2:
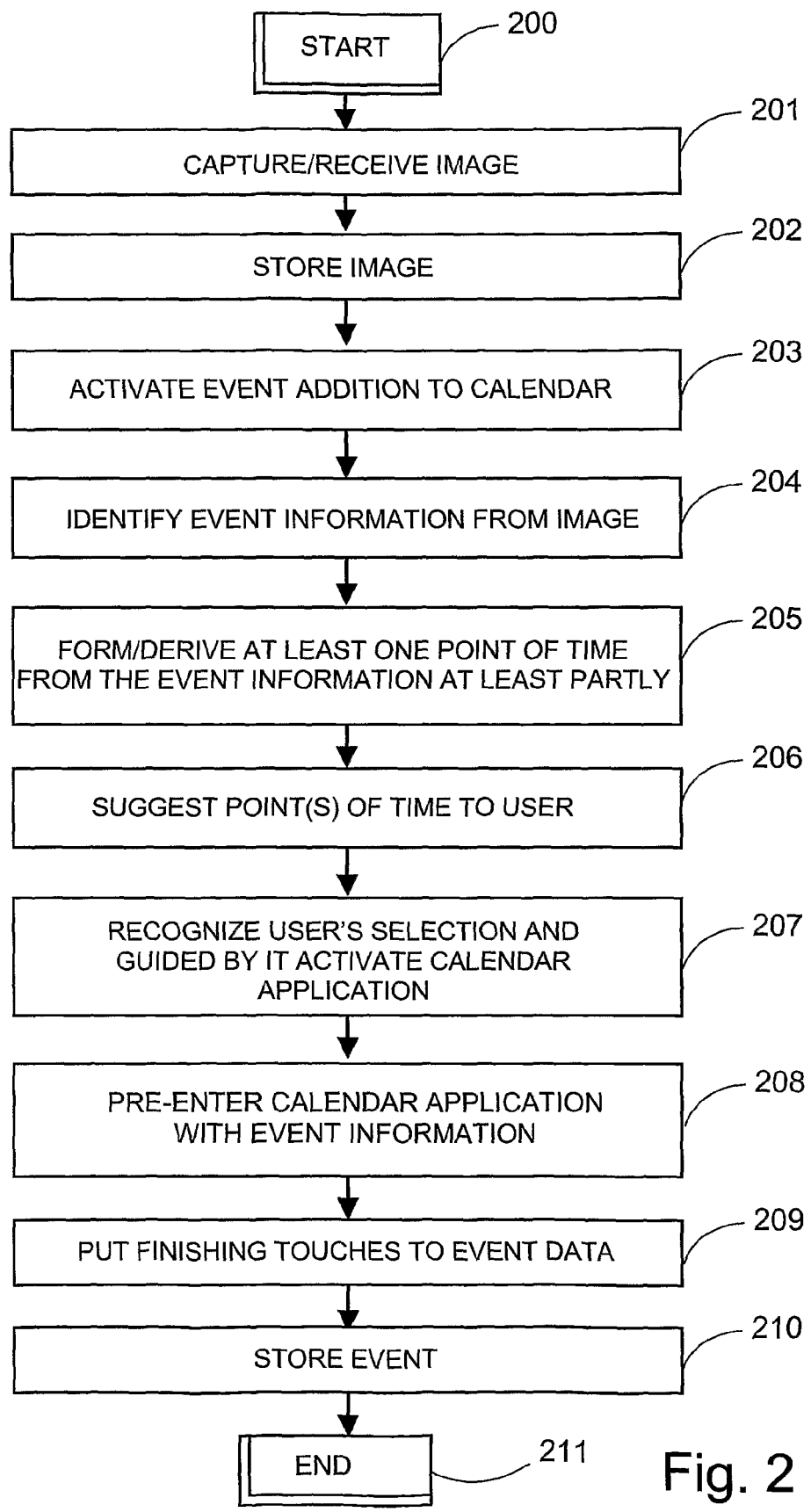
FIG. 2 shows an embodiment of the method according to the invention, applied to the device shown in FIG. 1.

The device 10' can now receive image information IMAGE, using the data-transfer means 15. The image information IMAGE can be sent from some other device 10.1, which can be, for example, a mobile station equipped with a camera CAM. One practical example of such a situation can be one in which the user of the camera phone 10.1 captures an image IMAGE of a rock-concert advertisement, which they can then send over the data communication network 16 to the device 10' (for example, a PC computer) of a friend. The image information IMAGE can be received, for example, as an MMS message (Multimedia Messaging Service), or by e-mail (method stage 201 of FIG. 2). According to the basic principle of the invention, at least part of the event information EVENT to be added to the calendar application CAL of the device 10' can be formed by the device 10' from the image IMAGE.

Figure 3:
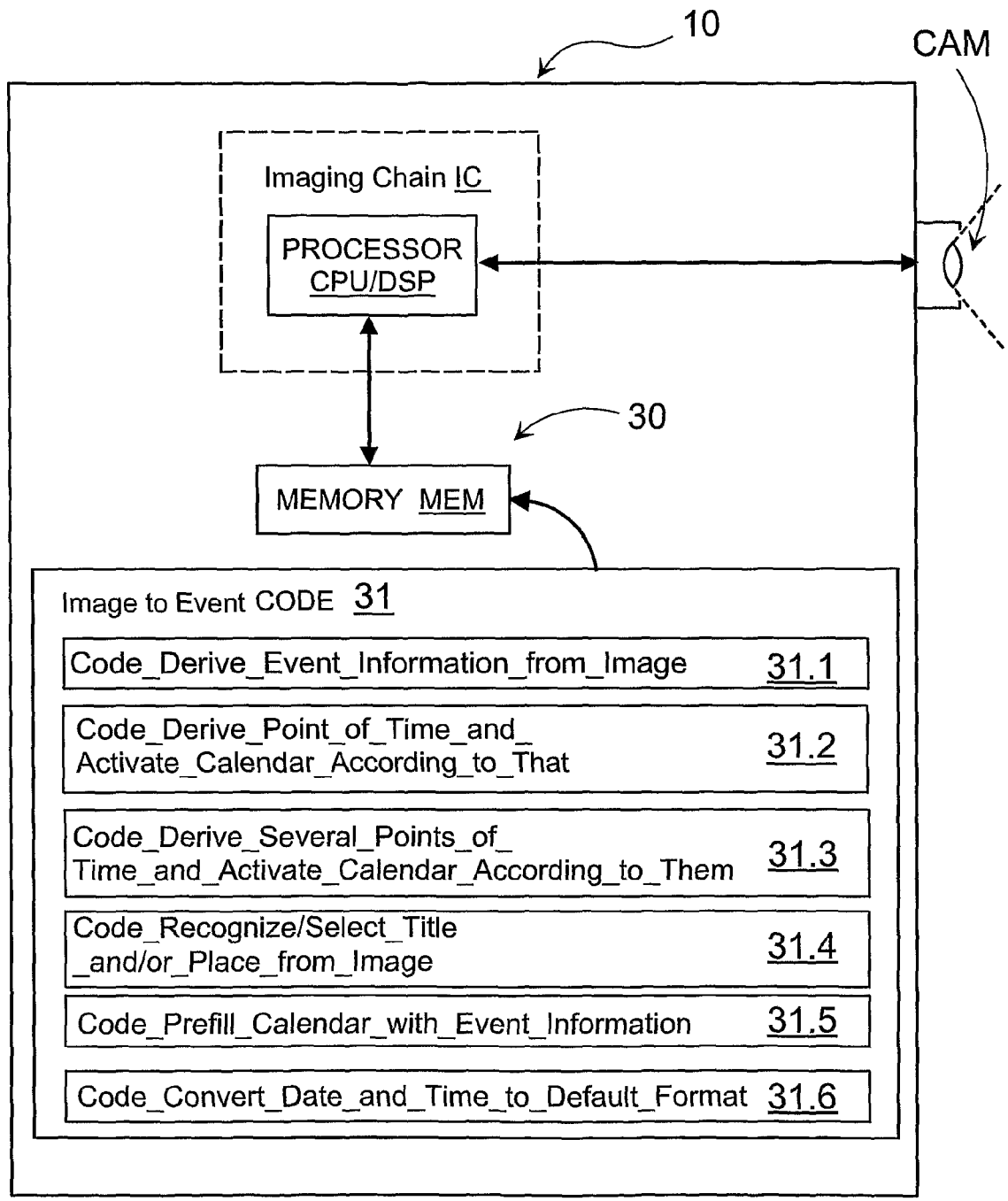
FIG. 3 shows an embodiment of the program product according to the invention.

FIG. 3 shows a rough schematic diagram of one embodiment of the program product 30 according to the invention. The program product 30 can comprise a memory medium MEM and program code 31, written on the memory medium MEM of the device 10, 10' to be executed using the processing means CPU of the device 10, 10'. The memory medium MEM for the program code 31 can be, for example, a memory card to be fitted to portable devices, or also a static or dynamic application memory of the device 10, 10', in which it can be directly integrated, for example, to form its own sub-module connected to the calendar application CAL.

The program code 31 to be arranged in the electronic device 10, 10' according to the invention can comprise several code means 31.1-31.6, to be executed using the processor means CPU, the operation of which can adapted precisely to the foregoing method descriptions. The code means 31.1-31.6 can form a set of processor commands to be performed consecutively, by means of which the desired functionalities in terms of the invention are achieved in the device 10, 10' according to the invention. Reference has been made to the code means 31.1-31.6 at suitable points in the above description.

Although in the embodiments above the invention is described by applying keywords, in the invention, for example, a point in time, such as, for example, a date and/or time can be identified directly from a date or time without the possible keywords that may precede them, or suffixes. The knowledge 31 in the device 10 can identify a consecutive number series, which is, for example, either written without a break or equipped with a separator characters, as such for example, forming a date or time of day. Some examples of the separator characters are dot "." or a slash "/". The knowledge 31 of the device 10 can be used to decide whether a number series understood to be a date candidate could be an actual date, which is intended to be added to the calendar CAL.

Further, according to one embodiment, no matter whether keywords or the direct identification of the point of time from the actual time-information candidate are applied in the invention, the forming of the formal event information can be automated to take place even entirely without user interaction. In that case, the sub-stage 206 shown in FIG. 2 can be optional, or it can even be omitted entirely. In the same way, identification of the user's selection can be omitted from stage 207. If the event information can be identified/formalized unambiguously, then it is possible to propose directly to the user that the event be added in the calendar application on a specific date or even time of day identified from the image, by opening, for example, the calendar CAL directly at a location corresponding to the day in question and then by activating the addition of the event. Thus the user need not wade through the possible hierarchical calendar application CAL and the event is set really easily.

Although the invention is described above in different embodiments, it will nevertheless be obvious to one versed in the art that the various embodiments can be varied in conjunction with each other in several different ways. The special feature of some embodiment can then be implemented without restrictions in some other embodiment too. The operating stages of the method can also be modified, without altering the basic idea of the invention.

It must be understood that the device according to the invention is depicted above from the perspective of a Finnish user. The method according to the invention can, understandably, also be tailored to all calendar, language, and character environments, so that the description should not be interpreted even in this sense as being in any way restricting. Instead of only body text of entirely equal in value being identified as data from the free form image, the invention permits text to be converted to data that is more formal than before. This permits data of a defined format to be linked to a specific calendar data field. This achieves the easier and quicker collection of calendar data.

Through the formalization of the body text according to the invention, it is possible to take into account the basic properties of calendar applications CAL considerably better than in the prior art, and in particular the general features natural for their user interfaces. The user interfaces of calendar applications CAL generally follow in one way or another a certain type of hierarchically formed index/interleaf structure. This can be understood as, for example, month-indexing, week-indexing, day-indexing, and/or even hour-indexing within each day. The consequence of this is that, only identifying the body text and guiding it directly as such to the calendar application CAL, does not solve the problem inherited from the hierarchical nature of the interface features of calendar applications.

Through the formalization of the body text according to the invention, it is possible to implement the guiding of the event information more precisely than previously. Thus, guided by the formalized event information, it is possible to reach not only the application level only, but also to a deeper sub-level, such as, for example, a month, week, day, or even more precisely a time-of-day interval identified from the body text. One versed in the art will understand that the advantage is analogous to that of being able to activate directly, owing to the invention, the "add event" function of the calendar application CAL, which is thus pre-entered with formal information identified from the body text. Generally, in the "add event" function there are separate fields for an event description, and the event location, date, and time, of which owing to the invention the date and/or time, for example, can be pre-entered.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. A portable palm apparatus comprising:
   a camera configured to capture an image comprising image information which image information is formed from an information source that has characters in a location-independent layout;
   a calendar application, in which event information is configured to be maintained, and
   a processor, a memory, and a computer program code, wherein said memory and the computer program code are configured, with the processor, to cause the apparatus to form event information for the calendar application from the characters of the image information, and to derive from said characters of the image information at least point of time information by using optical character recognition and, in response to deriving said at least point of time from said image information, to activate said calendar application, open corresponding point of time in said calendar application and cause display of said point of time of the calendar application to a user.

2. Apparatus according to claim 1, wherein the apparatus also includes a camera configured to form the image information.

3. Apparatus according to claim 1, wherein the apparatus also includes a data-transferrer configured to receive the image information.

4. Apparatus according to claim 1, wherein at least part of concerning two or more points of time is configured to be derived from the image information, at least one of the derived point of time is configured to be selected, guided by which selected point of time the calendar application is configured to active and open.

5. Apparatus according to claim 1, in which the event information (EVENT) includes description information, wherein, in addition, description information relating to the point of time is configured to be identified from the image information, from which a description is configured to be formed in the calendar application for the said point of time.

6. Apparatus according to claim 1, wherein the calendar application is configured to be pre-entered with the point of time or description that has been derived or selected.

7. Apparatus according to claim 1, wherein the apparatus is configured to convert the point of time derived from the image information at least partly to the presentation format according to the settings of the apparatus or the calendar application.

8. A method for adding event information to a calendar application of a portable palm device, comprising:
   capturing, by a camera comprised in the portable palm device, an image comprising image information which image information is formed from an information source that has characters in a location-independent layout;
   forming, in the portable palm device, said event information for the calendar application by using a processor of the portable palm device, from the characters of the image information,
   configuring the processor to derive from said characters of the image information at least point of time information by using optical character recognition; and
   in response to deriving said at least point of time from said image information, configuring the processor to activate said calendar application, to open corresponding point of time in said calendar application and to cause display of said point of time of the calendar application to a user.

9. Method according to claim 8, wherein the image information is formed by a camera belonging to the electronic device.

10. Method according to claim 8, wherein the image information is received from some second device.

11. Method according to claim 8, wherein at least part of concerning two or more points of time is derived from the image information, at least one point of time is selected from the derived points of time, guided by which selected point of time the calendar application is activated and opened.

12. Method according to claim 8, in which the event information includes description information, wherein, in addition description information relating to the point of time is also identified from the image information, from which a description for the said point of time is formed to the calendar application.

13. Method according to claim 8, wherein the calendar application is pre-entered with the derived or selected point of time and description.

14. Method according to claim 8, wherein the point of time derived from the image information is converted at least partly to a presentation format according to the settings of the device or the calendar application.

* * * * *